US012056493B2

(12) United States Patent
Song et al.

(10) Patent No.: US 12,056,493 B2
(45) Date of Patent: Aug. 6, 2024

(54) PROCESSOR AND OPERATING METHOD THEREOF FOR RENAMING DESTINATION LOGICAL REGISTER OF MOVE INSTRUCTION

(71) Applicant: Shanghai Zhaoxin Semiconductor Co., Ltd., Shanghai (CN)

(72) Inventors: Chenchen Song, Beijing (CN); Yu Zhang, Beijing (CN); Mengchen Yang, Beijing (CN); Jianbin Wang, Beijing (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 0 days.

(21) Appl. No.: 17/515,538

(22) Filed: Oct. 31, 2021

(65) Prior Publication Data

US 2022/0137966 A1 May 5, 2022

(30) Foreign Application Priority Data

Oct. 30, 2020 (CN) .......................... 202011187263.X

(51) Int. Cl.
*G06F 9/38* (2018.01)
*G06F 9/30* (2018.01)

(52) U.S. Cl.
CPC .......... *G06F 9/384* (2013.01); *G06F 9/30032* (2013.01); *G06F 9/3856* (2023.08)

(58) Field of Classification Search
CPC .. G06F 9/384; G06F 9/30032; G06F 9/30105; G06F 9/30112; G06F 9/3855; G06F 9/3856
See application file for complete search history.

(56) References Cited

U.S. PATENT DOCUMENTS

| 6,101,578 A | 8/2000 | Patwardhan et al. |
| 6,594,754 B1 * | 7/2003 | Jourdan .................. G06F 9/384 |
| | | 712/216 |

(Continued)

FOREIGN PATENT DOCUMENTS

| CN | 1414464 | 4/2003 |
| CN | 1514373 | 7/2004 |

(Continued)

OTHER PUBLICATIONS

"Notice of allowance of China Counterpart Application", issued on Nov. 9, 2022, p. 1-p. 5.

(Continued)

*Primary Examiner* — Courtney P Spann
(74) *Attorney, Agent, or Firm* — JCIPRNET

(57) ABSTRACT

A processor and an operating method thereof for renaming a destination logical register of a move instruction are provided. The processor comprises a plurality of physical registers and a renaming circuit. The renaming circuit is coupled to the plurality of physical registers and is configured to receive an instruction sequence and check the instruction sequence. When a current instruction of the instruction sequence comprises the move instruction, the renaming circuit assigns a first physical register, which is assigned to a source logical register of the current instruction previously, to the destination logical register of the current instruction. The first physical register is one of the plurality of physical registers.

21 Claims, 5 Drawing Sheets

(56) References Cited

U.S. PATENT DOCUMENTS

| | | |
|---|---|---|
| 2003/0229763 A1 | 12/2003 | Hooker |
| 2004/0139281 A1 | 7/2004 | McDonald |
| 2004/0158682 A1 | 8/2004 | Hooker |
| 2012/0005459 A1* | 1/2012 | Fleischman ......... G06F 9/30032 |
| | | 712/216 |
| 2013/0275720 A1* | 10/2013 | Keller ................. G06F 9/30181 |
| | | 712/205 |
| 2014/0068230 A1* | 3/2014 | Madduri ............. G06F 9/30145 |
| | | 712/216 |
| 2014/0129804 A1* | 5/2014 | King ................... G06F 9/30109 |
| | | 712/30 |
| 2014/0189324 A1* | 7/2014 | Combs ................ G06F 12/0292 |
| | | 712/225 |
| 2014/0310504 A1* | 10/2014 | Kadgi ................. G06F 9/30105 |
| | | 712/32 |
| 2017/0132010 A1* | 5/2017 | Vasekin .................. G06F 9/384 |
| 2017/0185410 A1* | 6/2017 | Abernathy .......... G06F 9/30181 |
| 2019/0190536 A1* | 6/2019 | Swanson ............. G06F 12/0891 |
| 2021/0303308 A1* | 9/2021 | Smith ................. G06F 9/30032 |

FOREIGN PATENT DOCUMENTS

| | | |
|---|---|---|
| CN | 1514374 | 7/2004 |
| CN | 1890631 | 1/2007 |
| CN | 104615409 | 5/2015 |
| CN | 105511916 | 4/2016 |
| CN | 108279928 | 7/2018 |
| CN | 111221575 | 6/2020 |

OTHER PUBLICATIONS

"Office Action of China Counterpart Application", issued on May 19, 2022, p. 1-p. 7.

* cited by examiner

PROCESSOR AND OPERATING METHOD THEREOF FOR RENAMING DESTINATION LOGICAL REGISTER OF MOVE INSTRUCTION

CROSS-REFERENCE TO RELATED APPLICATION

This application claims the priority benefit of china application no. 202011187263.X, filed on Oct. 30, 2020. The entirety of the above-mentioned patent application is hereby incorporated by reference herein and made a part of this specification.

TECHNICAL FIELD

The invention relates to a processor and an operating method thereof, and more particularly to a processor and an operating method that can improve an execution efficiency of an instruction sequence.

BACKGROUND

The number of physical registers is limited in a general processor. Particularly, when a move instruction instructs to move data from a source logical register to a destination logical register, the conventional processor firstly assigns two physical registers as the destination logical register and the source logical register for this move operation, respectively. And then, the conventional processor performs a data migration between these two physical registers during the move instruction execution. However, the aforementioned data migration consumes processor resources as well as computational time. There is an urgent need to optimize the utilization of these physical registers and to reduce the resource consumption and the computational time of the processor as well.

SUMMARY

The invention provides a processor and an operating method thereof to optimize the utilization of these physical registers and to reduce the resource consumption and the computational time of the processor as well.

A processor of the invention includes a plurality of physical registers and a renaming circuit. The renaming circuit configured to receive and check an instruction sequence is coupled to the plurality of physical registers. When a current instruction of the instruction sequence includes a move instruction, the renaming circuit assigns a first physical register, which was assigned to a source logical register of the current instruction, to a destination logical register of the current instruction. Herein, the first physical register is one of the plurality of physical registers.

An operating method of a processor of the invention includes: receiving and checking an instruction sequence; when a current instruction of the instruction sequence includes a move instruction, assigning a first physical register, which was assigned to a source logical register of the current instruction, to a destination logical register of the current instruction, herein the first physical register is one of the plurality of physical registers.

In various embodiments of the invention, the processor and the operating method of the invention check whether the current instruction of the instruction sequence includes a move instruction. When the current instruction of the instruction sequence includes the move instruction, the processor determines whether to assign the first physical register, which was assigned to the source logical register of the current instruction, to the destination logical register of the current instruction, so as to optimize the use of the physical registers and to reduce consumptions on processor resources and computational time.

DETAILED DESCRIPTION

Figure 1:
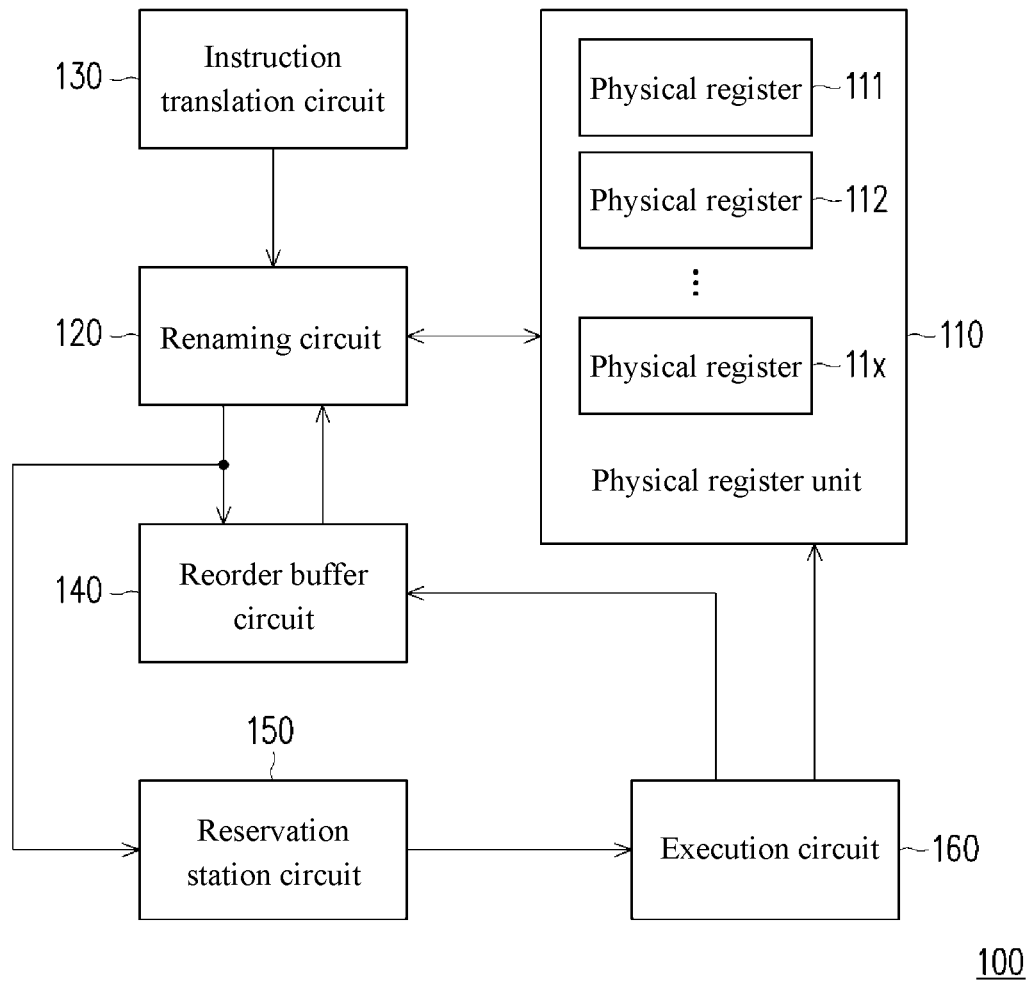
FIG. 1 is a circuit block diagram of a processor according to an embodiment of the invention.

FIG. 1 is a circuit block diagram of a processor 100 according to an embodiment of the invention. Referring to FIG. 1, the processor 100 includes a physical register unit 110 and a renaming circuit 120. The renaming circuit 120 is coupled to the physical register unit 110. The physical register unit 110 includes a plurality of physical registers, such as physical registers 111, 112, . . . , 11x shown in FIG. 1. These physical registers 111 to 11x may be, for example, storage elements with limited storage capacity in the processor used to store data.

The processor 100 further comprises an instruction translation circuit 130, which may be called as an instruction translator. The instruction translation circuit 130 may receive/obtain an original instruction from an instruction cache (not shown) and may convert (translate) this original instruction into an instruction sequence including at least one microinstructions. For the sake of illustrations, the following paragraphs simply employ "instruction" in embodiments and do not distinguish an instruction as a macroinstruction or a microinstruction hereinafter because anyone of those skilled persons in the art is able to recognize an instruction indicating a macroinstruction or a microinstruction currently. In addition, each of these instructions may include an instruction type, a destination operand such as a destination logical register, and a source operand such as a source logical register. Both the destination logical register and the source logical register are logical registers refers to architectural registers in the following embodiments, which will not be described hereinafter. The following is an example of the instruction sequence:

ADD RAX IMM; Instruction (1)
MOV RCX RAX; Instruction (2)
ADD RDX RCX; Instruction (3)

The instruction sequence shown in the example includes an Instruction (1), an Instruction (2) and an Instruction (3). The instruction type of the Instruction (1) is ADD, which indicates that the Instruction (1) is an addition instruction. The destination operand of the Instruction (1) is a logical register RAX including 64 bits and the source operand of the Instruction (1) is an immediate operand IMM. The instruction type of the Instruction (2) is MOV, which indicates that the Instruction (2) is a move instruction. The destination operand of the Instruction (2) is a logical register RCX including 64 bits and the source operand of the Instruction (2) is the logical register RAX. The instruction type of the Instruction (3) is ADD, which indicates that the Instruction (3) is an addition instruction. The destination operand of the Instruction (3) is a logical register RDX including 64 bits and its source operand of the Instruction (3) is the logical register RCX. In this embodiment, according to the order of the instructions in the instruction sequence, when the Instruction (2) is a "current instruction", the Instruction (1) is a "previous instruction" of the Instruction (2) and the Instruction (3) is a "next instruction" of the Instruction (2). It should be noted that the "previous instruction" and the "next instruction" are only used to show the order of instructions, which does not try to limit an adjacent relationship between instructions. For example, the Instruction (1) being the "previous instruction" of the Instruction (2) merely means that the Instruction (1) is in front of the Instruction (2) in program order. There may be other instructions between the Instruction (1) and the Instruction. The Instruction (1) and the Instruction (2) may be adjacent to each other or not. Similarly, the Instruction (3) being the "next instruction" of the Instruction (2) merely means that the Instruction (3) is behind the Instruction (2) in program order. There may be other instructions between the Instruction (2) and the Instruction (3). The Instruction (2) and the Instruction (3) may be adjacent to each other or not. Please note there are data dependency between Instructions (1) to (3); however, any "other instruction" programmed between any two of the above three Instructions (1), (2), and (3) does not have the same data dependency as them. Moreover, the inventor realize that the move operation may be optimized by assigning both of its source/destination logical registers to an identical physical register such that the conventional move operation which moves the content stored in a source physical register to associated destination register may be skipped. Associated implementations are given in the following paragraphs.

As shown in FIG. 1, the processor 100 further includes a reorder buffer circuit 140, a reservation station circuit 150 and an execution circuit 160. The renaming circuit 120 receives the instruction sequence from the instruction translation circuit 130, and assigns required physical registers in the physical register unit 110 to the source logical register and the destination logical register for each instruction in the instruction sequence. The renaming circuit 120 sends the instruction sequence to the reorder buffer circuit 140 and the reservation station circuit 150. And then, the renaming circuit 120 updates a state of a physical register stored in the renaming circuit 120. The reservation station circuit 150 establishes a relationship between those instructions according to a physical register information, which may be assigned to the source operand of the instruction via the renaming circuit 120. After the operand preparation is completed, the reservation station circuit 150 issues the instruction sequence to the execution circuit 160 for execution. After finishing these executions of the instruction sequence, the execution circuit 160 forwards the execution result to the physical register unit 110 for storing, and set a completion flag for the executed instruction. Accordingly, if the renaming circuit 120 recognizes a move instruction within the instruction sequence delivered from the instruction translation circuit 130, it may assign one physical register in the physical register unit 110 to the both source/destination logical registers for this move instruction before issuing it for execution.

Figure 2:
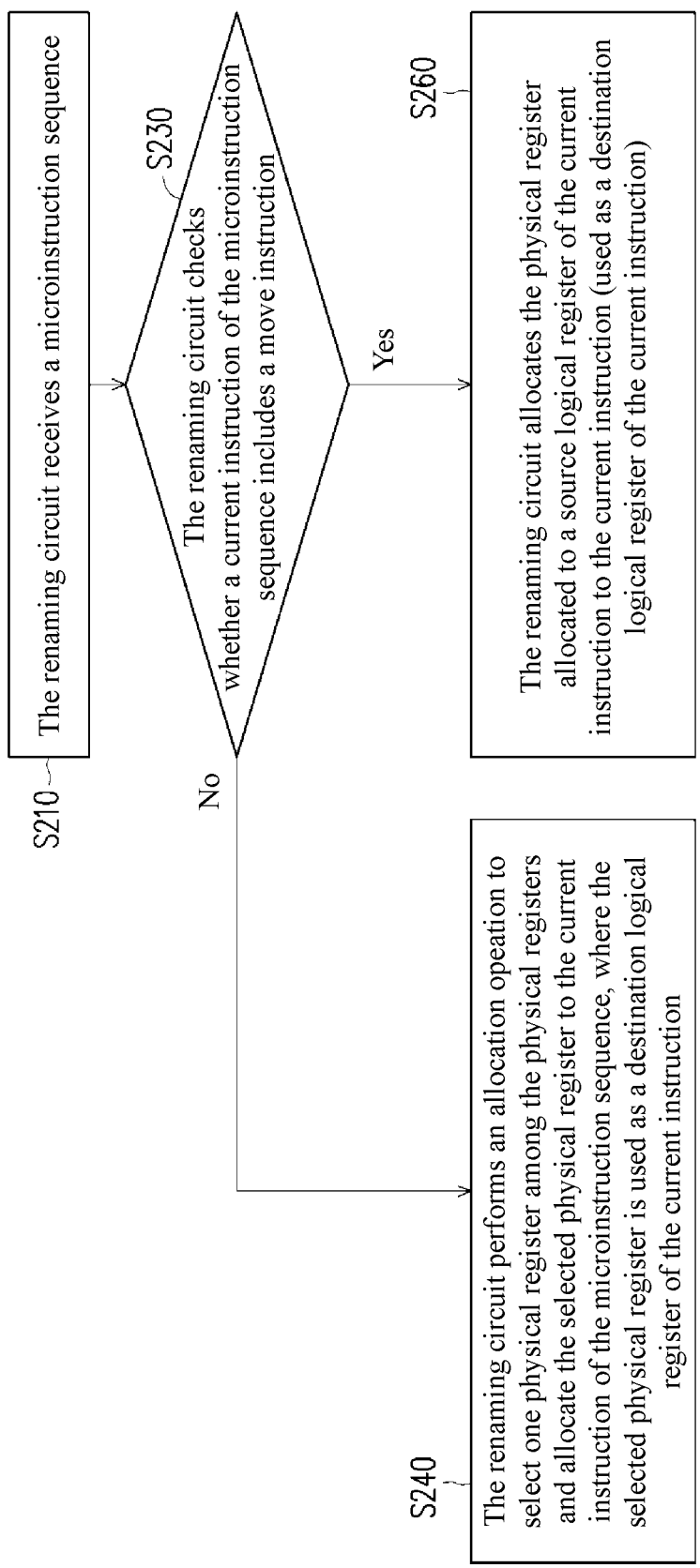
FIG. 2 is a flowchart of an operating method of a processor according to an embodiment of the invention.

FIG. 2 is a flowchart of an operating method of a processor according to an embodiment of the invention. Referring to FIG. 1 and FIG. 2, the renaming circuit 120 is coupled to the instruction translation circuit 130 to receive an instruction sequence from instruction translation circuit 130 (step S210). The renaming circuit 120 determines whether a current instruction of the instruction sequence includes a move instruction (step S230). When the determination result of the step S230 is "No", the renaming circuit 120 may execute step S240 to perform a first assignment operation. In step S240, the renaming circuit 120 performs the first assignment operation to select one physical register from these physical registers 111 to 11*x* in the physical register unit 110, and then assign the selected physical register to the current instruction of the instruction sequence as a destination logical register. In other words, the destination logical register of the current instruction is renamed as the selected physical register. In addition, the renaming circuit 120 records an assignment information of the first assignment operation in a mapping table, corresponding details will be described hereinafter.

Assume the Instruction (1) is the current instruction. The renaming circuit 120 may determine whether the Instruction (1) includes the move instruction in the step S230. Because the Instruction (1) does not include a move instruction now, the determination result of the step S230 is "No", such that the renaming circuit 120 performs the first assignment operation on the Instructions (1) (current instruction) in the step S240. In the step S240, the renaming circuit 120 may select one physical register, such as the physical register 111, from the physical registers 111 to 11*x* in the physical register unit 110. The renaming circuit 120 assigns the selected physical register 111 to the Instruction (1) (which is the current instruction) as the destination logical register RAX. In other words, the renaming circuit 120 renames the logical register RAX as the physical register 111.

When the current instruction of the instruction sequence includes a move instruction, the determination result of the step S230 is "Yes" and the renaming circuit 120 may execute step S260. Those skilled persons in the art are aware of the purpose of executing a move instruction is to make the contents, which may be stored in a physical register corresponding to the source logical register of the move instruction, migrate to the destination logical register of the move instruction. Accordingly, in the step S260, the renaming circuit 120 may directly assign a first physical register, which was assigned to the source logical register of the current instruction, to the destination logical register of the current instruction to skip associated move execution of the current instruction. Herein, the first physical register is one of the physical registers 111 to 11*x* of the physical register unit 110.

Assume the Instruction (2) is the current instruction. The renaming circuit 120 may determine whether the Instruction (2) includes a move instruction (step S230). When the Instruction (2) (current instruction) includes the move instruction, the determination result of the step S230 is "Yes", and the renaming circuit 120 executes step S260 to performs a second assignment operation. Since the destination logical register of the Instruction (1) (previous instruction) is the source logical register of the Instruction (2), the renaming circuit 120 performs the second assignment operation to assign the first physical register in the step S260, such as the physical register 111, which was assigned to the Instruction (1) as its destination logical register RAX previously, to the Instruction (2) (current instruction) as the destination logical register RCX of the Instruction (2) (current instruction). In other words, the renaming circuit 120 may rename the logical register RCX of the Instruction (2) as the first physical register (such as the physical register 111), such that the logical register RAX of the Instruction (2)

and the logical register RCX of the Instruction (2) are both correspond to (map to) the same first physical register (such as the physical register 111).

In another embodiment, in step S230, when the current instruction is determined to include a move instruction, the renaming circuit 120 further determines whether a source operand and a destination operand of the current instruction are both logical registers. If the source operand and the destination operand of the current instruction are both logical registers, the determination result of step S230 is "Yes"; otherwise, the determination result of step S230 is "No".

In summary, when the current instruction includes a move instruction, and the source logical register of the current instruction is the destination logical register of the previous instruction (e.g., logical register RAX in Instructions (1) and (2)), i.e., the first physical register assigned to the destination logical register of the Instruction (1) previously is the physical register assigned to the source logical register of the current instruction. The renaming circuit 120 assigns the physical register, which was assigned to the source logical register of the instruction (i.e., the physical register assigned to the destination logical register of the previous instruction), to the destination logical register of the current instruction.

Figure 3:
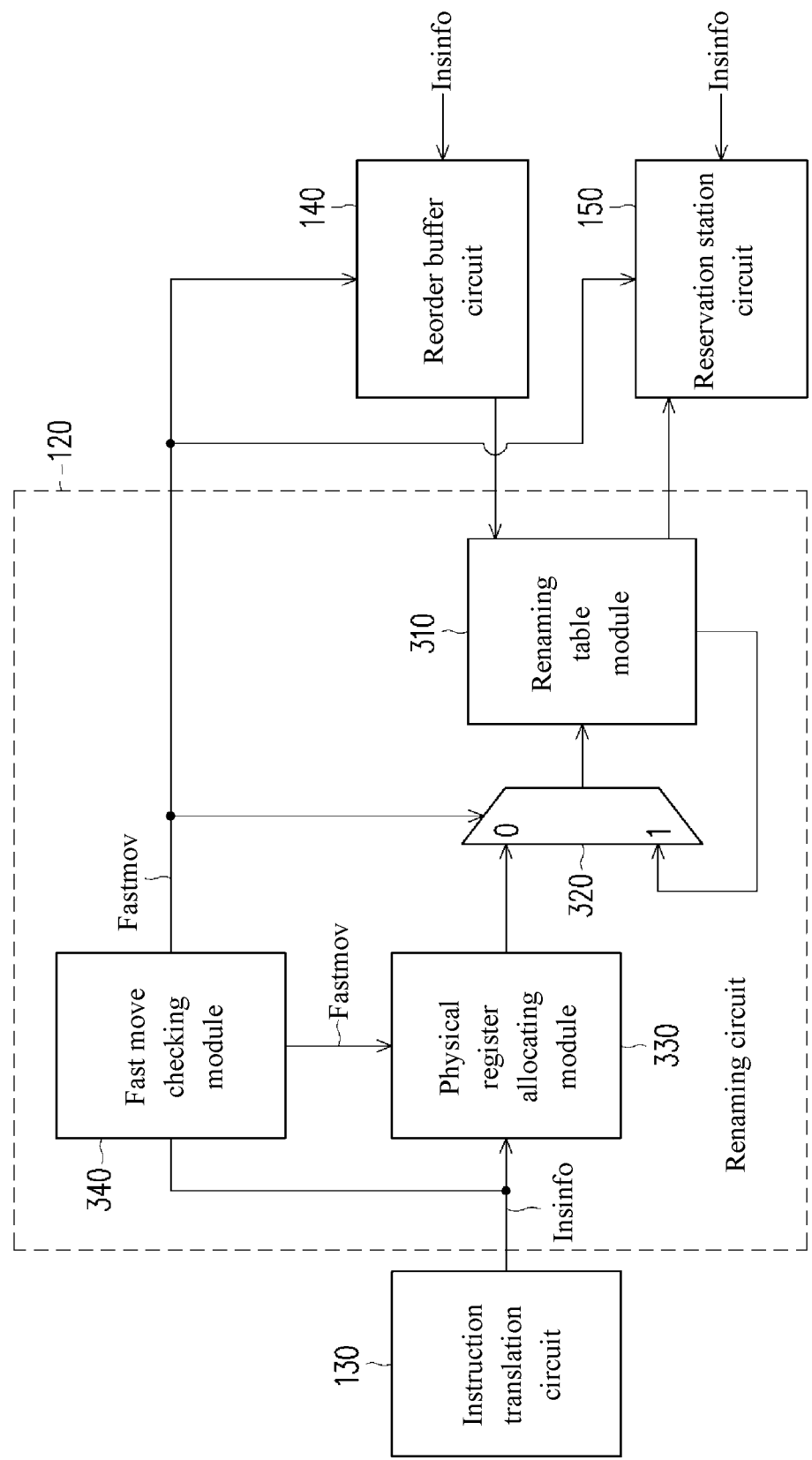
FIG. 3 is a circuit block diagram of a renaming circuit according to an embodiment of the invention.

FIG. 3 illustrates a circuit block diagram of the renaming circuit 120 of FIG. 1 according to an embodiment of the invention. Referring to FIGS. 1 to 3, the renaming circuit 120 includes a renaming table module 310, a multiplexer 320, a physical register assignment module 330 and a fast move checking module 340. The renaming circuit 120 receives the instruction sequence, which is included in a instruction-related information Insinfo, from the instruction translator circuit 130, updates the instruction-related information Insinfo, and sends an updated instruction-related information Insinfo to the reorder buffer (ROB) circuit 140 and the reservation stations (RS) circuit 150. In one embodiment, the fast move checking module 340 may be a combinational circuitry which may be responsive to the indication of Insinfo to assert or de-assert a Fastmov signal conveying to both the a multiplexer 320 and a physical register assignment module 330 inside the renaming circuit 120, as well to the reorder buffer circuit 140 and the reservation station circuit 150. In another embodiment, the physical register assignment module 330, the reorder buffer circuit 140, and the reservation station circuit 150 may be made by introducing the disclosed renaming function into a conventional physical register assignment module, such that they may perform the disclosed renaming function in responsive to the indication of the Fastmov signal from the fast move checking module 340. Those skilled persons in the art may design the aforementioned modules and/or hardware of their processors according to applications, but all modifications without deviating the spirits of this invention should be included in the appended claims.

The fast move checking module 340 may determine whether the current instruction of the instruction sequence is a move instruction as the operation in step S230 of FIG. 2, to generate a check result Fastmov, which may be sent to control the physical register assignment module 330 and a multiplexer 320. As shown in FIG. 3, when the current instruction does not include a move instruction, i.e., the determination result of step S230 is "No", the check result Fastmov is logic 0. When the current instruction includes a move instruction, i.e., the determination result of step S230 is "Yes", the check result Fastmov is logic 1. Please note the meaning of the logical value of the check result Fastmov should not be limited to the example shown in FIG. 3. In other embodiments, the indication assigned to the logical value of the check result Fastmov may be defined according to design requirements.

As shown in FIG. 3, a first input terminal of the multiplexer 320 is coupled to the renaming table module 310 to read an assignment information stored in the renaming table module 310 previously. The second input terminal of the multiplexer 320 is coupled to the physical register assignment module 330 to receive the assignment information of the first assignment operation. The output terminal of the multiplexer 320 is coupled to the renaming table module 310 to transmit the assignment information of the first assignment operation to the renaming table module 310. The control terminal of the multiplexer 320 is coupled to the fast move checking module 340 to receive the check result Fastmov.

When the check result Fastmov is logic 0, the physical register assignment module 330 may be enabled to perform the first assignment operation in step S240. The physical register assignment module 330 may assign one of the physical registers 111 to 11$x$ of the physical register unit 110 to the current instruction of the instruction sequence, as the destination logical register of the current instruction. And then, the physical register assignment module 330 records and sends the assignment information of the first assignment operation to the multiplexer 320. The multiplexer 320 selects to transmit the assignment information of the first assignment operation to the renaming table module 310.

When the check result Fastmov is logic 0, assume the instruction sequence received by the renaming circuit 120 includes the Instructions (1), (2), and (3) described above. In step S240, the physical register assignment module 330 of the renaming circuit 120 may perform the first assignment operation on the current instruction (such as the Instruction (1)), i.e., the physical register assignment module 330 assigns the aforementioned first physical register (such as the physical register 111) to the destination logical register (such as the destination logical register RAX of the Instruction (1)) of the current instruction. In other words, the physical register assignment module 330 may rename the logical register of the current instruction as the first physical register. In step S240, the physical register assignment module 330 further records the assignment information of the first assignment operation, and update the assignment information of the first assignment operation in the renaming table module 310 through the multiplexer 320.

This embodiment does not limit the implementation and data structure of the renaming table module 310. For instance, in some embodiments, the renaming table module 310 comprises numeric fields shown by Table 1 below. The physical register assignment module 330 may record the assignment state of the assignment operation. For example, Table 1 shows the assignment of the first assignment operation in the renaming table module 130, which demonstrates the mapping relationship between destination registers and associated physical registers. For example, Table 1 shows the mapping relationship that the destination logical register RAX of the Instruction (1) (current instruction) is mapped with the physical register 111 . . . ".

TABLE 1

| An example of the renaming table module 310 | |
|---|---|
| Logical register | Physical register |
| RAX | 111 |
| . . . | . . . |

When the current instruction comprises the move instruction, i.e., the determination result of step S230 is "Yes", the check result Fastmov is logic 1. The physical register assignment module 330 may be disabled according to the check result Fastmov being logic 1. The renaming circuit 120 executes step S260 to perform the second assignment operation according to the logic 1 conveyed by the check result Fastmov. In step S260, the renaming circuit 120 may perform the second assignment operation to directly assign the first physical register, which was assigned to the source logical register of the current instruction, to the destination logical register of the current instruction according to the assignment information of the first assignment operation in the renaming table module 310. And then, the renaming circuit 120 records an assignment information of the second assignment operation stored in the renaming table module 310 previously. Specifically, the multiplexer 320 reads the information of the first physical register, which was assigned to the source logical register of the current instruction previously (i.e., was assigned to the destination logical register of the previous instruction previously, since the current instruction is a move instruction), from the renaming table module 310, and to assign the first physical register to the destination logical register of the current instruction. The renaming table module 310 may store the assignment information of both the first assignment operation and the second assignment operation.

Assume the Instruction (2) is the current instruction now. In the step S260, the multiplexer 320 of the renaming circuit 120 may assign the first physical register (such as the physical register 111), which was assigned to the source logical register RAX of the Instruction (2) (current instruction) to the destination logical register RCX of the Instruction (2) according to the assignment of the first assignment operation of the Instruction (1) (previous instruction) as shown by Table 1) in the renaming table module 310. In other words, the logical register RCX is renamed to the first physical register (such as the physical register 111). Then, the renaming circuit 120 may record the assignment of the second assignment operation in the renaming table module 310 as shown in Table 2. Table 2 shows the assignment of the second assignment operation, which demonstrates the mapping relationship between destination registers and associated physical registers. For example, Table 2 shows the mapping relationship that the destination logical register RCX of the Instruction (2) (current instruction) is mapped with the physical register 111 . . . ".

TABLE 2

Another example of the renaming table module 310

| Logical register | Physical register |
|---|---|
| RAX | 111 |
| RCX | 111 |
| . . . | . . . |

As shown in FIG. 3, the renaming circuit 120 further provides the check result Fastmov to the reorder buffer circuit 140. When the check result Fastmov is logic 1 (i.e., the current instruction is determined as a move instruction), the reorder buffer circuit 140 may set a completion flag to mark the current instruction has been executed. For instance, assume the Instruction (2) is the current instruction, if the check result Fastmov is logic 1 (i.e., the Instruction (2) is determined as a move instruction), the reorder buffer circuit 140 may set the completion flag to mark the Instruction (2) (move instruction) has been executed. In other words, when the check result Fastmov is logic 1, the reorder buffer circuit 140 may consider that the Instruction (2) has been executed, and set the completion flag to mark the Instruction (2) has been executed. This embodiment does not limit the implementation and specific functions of the reorder buffer circuit 140. For example, according to design requirements, the reorder buffer circuit 140 may be a known reorder buffer or any reorder buffer circuits having the essential functions of commonly used reorder buffer but having additionally functions designed according to specific requirements. In another embodiment, the check result Fastmov may be included in the updated instruction-related information Insinfo being conveyed to the reorder buffer circuit 140.

As shown in FIG. 3, the renaming circuit 120 further provides the check result Fastmov to the reservation station circuit 150. After assigning the physical register to the current instruction, the renaming circuit 120 sends the current instruction as well as the check result Fastmov to the reservation station circuit 150, which may thereafter send the current instruction to the execution circuit 160 (as shown in FIG. 1) for executions. When the check result Fastmov is logic 0, i.e., the current instruction is not a move instruction, the reorder buffer circuit 140 may set the completion flag to mark the current instruction has been executed after the current instruction is executed. In other words, the completely executed current instruction is ready for retirement after setting the completion flag. When the check result Fastmov is logic 1, i.e., the current instruction is a move instruction, the reservation station circuit 150 ignores (skip, or does not receive) the current (move) instruction, because the execution result (of the move operation) has been stored in the physical register identical to that assigned to the source logical register (of the move operation), so that the execution circuit 160 do not have to execute the (move) current instruction.

For instance, assume the Instruction (2) (move instruction) is the current instruction. The check result Fastmov is logic 1, and the reservation station circuit 150 ignores (skip, or does not receive) the Instruction (2). Therefore, the execution circuit 160 will not execute the Instruction (2). This embodiment does not limit the implementations and specific functions of the reservation station circuit 150. For example, according to design requirements, the reservation station circuit 150 may be a known reservation station circuit or other reservation station circuits, and the execution circuit 160 may be a known instruction execution circuit or other instruction execution circuits.

In the above example, no other instruction is programmed between the Instructions (1) and (2) or between the Instructions (2) and (3). However, the invention is not limited in this regard. In another embodiment, when a source logical register of an additional instruction is different from the destination logical register of the Instruction (1), and a destination logical register of this additional instruction is different from the source logical register of the Instruction (2), the additional instruction may be programmed between the Instruction (1) and (2). Similarly, when the source logical register of a further additional instruction is different from the destination logical register of the Instruction (2), and the destination logical register of the further additional instruction is different from the source logical register of the Instruction (3), the further additional instruction may be programmed between the Instruction (2) and (3).

In another embodiment, register bit(s) used by the instruction may be partial bits of the physical register. All bits of one physical register may be divided into higher-order bits and lower-order bits. Exemplarily, for a 64-bit physical register, the higher-order bits and lower-order bits may be 32 higher bits (bits 32 to 63) and lower 32 bits (bits 0 to 31) of this 64-bit physical register, respectively. The following is another example of the instruction sequence:

ADD RAX IMM; Instruction (4)
MOV ECX EAX; Instruction (5)
ADD RDX RCX; Instruction (6)

The instruction sequence shown in the above example includes an Instruction (4), an Instruction (5) and an Instruction (6). The instruction type of the Instruction (4) is ADD, which indicates that the Instruction (4) is an addition instruction. The destination operand of the Instruction (4) is the logical register RAX including 64 bits and the source operand of the Instruction (4) is an immediate operand IMM. The instruction type of the Instruction (5) is MOV, which indicates that the Instruction (5) is a move instruction. The destination operand of the Instruction (5) is a logical register ECX including the lower-order 32 bits ((bits 0 to 31) of the logical register RCX and the source operand of the Instruction (5) is a logical register EAX including the lower-order bits (bits 0 to 31) of the logical register RAX. The instruction type of the Instruction (6) is ADD, which indicates that the Instruction (6) is an addition instruction. The destination operand of the Instruction (6) is the logical register RDX including 64 bits and the source operand of the Instruction (6) is the logical register RCX including 64 bits.

Figure 4A:
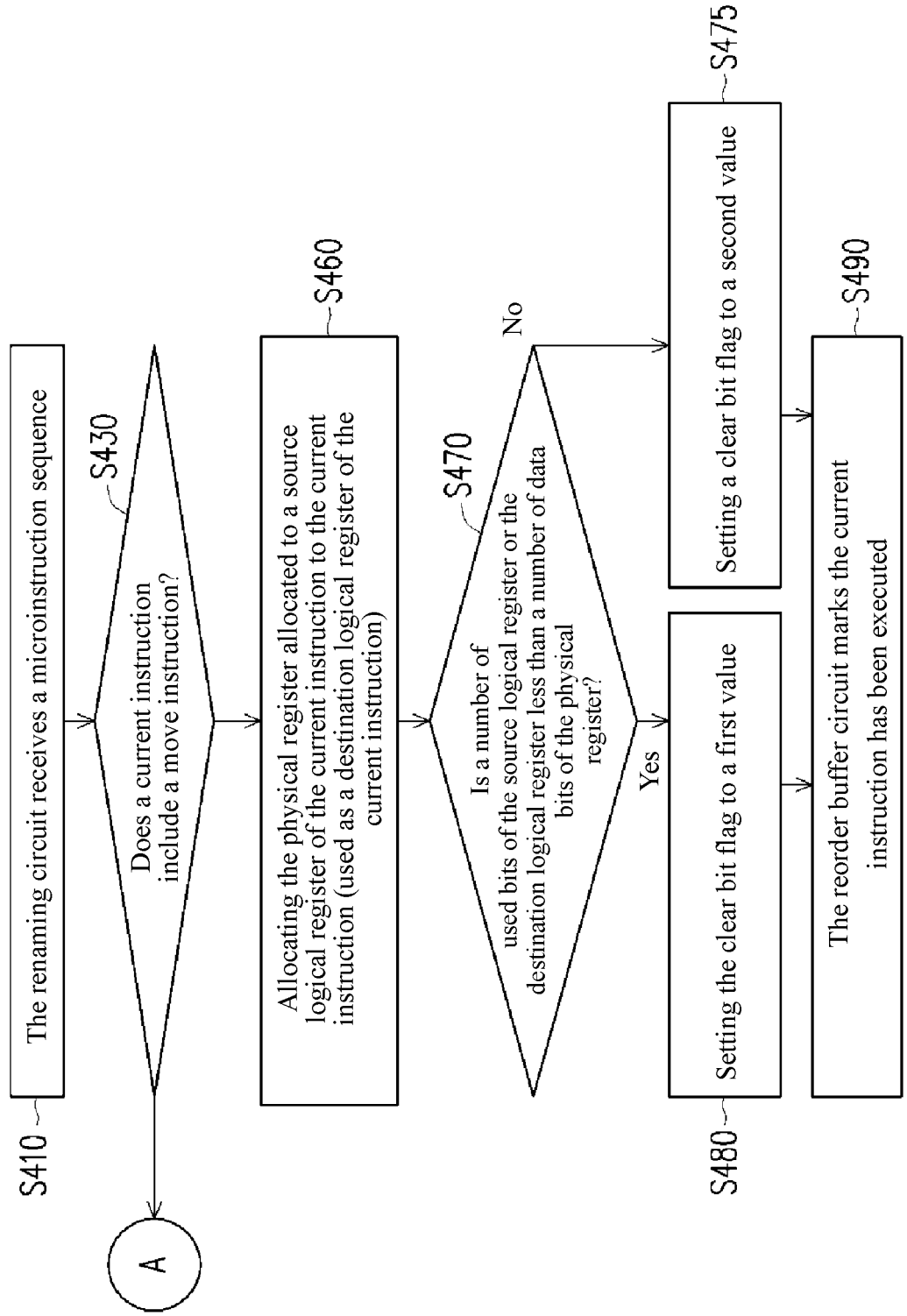
FIG. 4A and FIG. 4B are flowcharts of an operating method of a processor according to another embodiment of the invention.
Figure 4B:
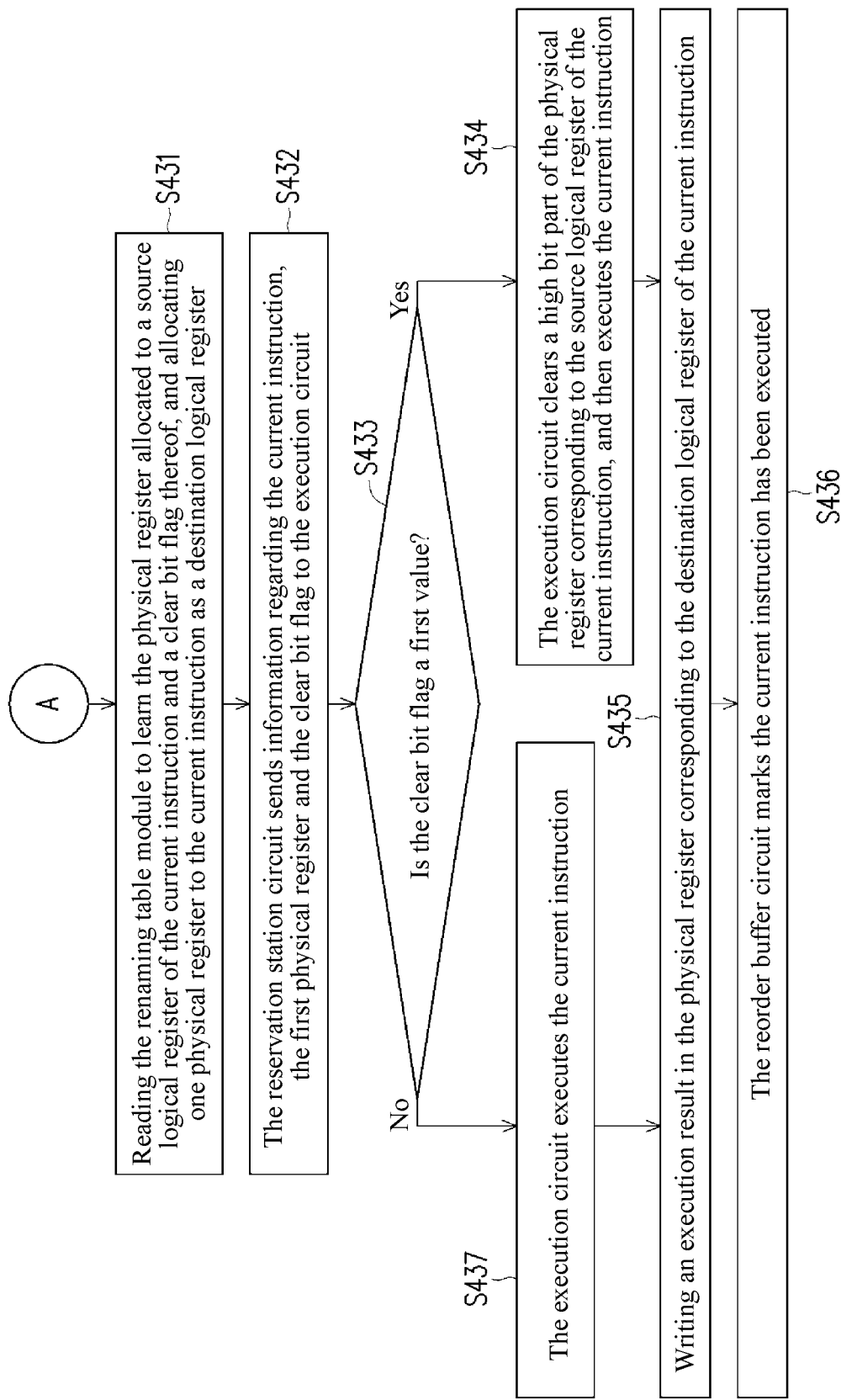

FIG. 4A and FIG. 4B are flowcharts of an operating method of a processor according to another embodiment of the invention. For steps S410, S430 and S460 shown in FIG. 4A, reference may be made to the relevant descriptions of steps S210, S230 and S260 shown in FIG. 2, which will not be repeated here. Steps S470, S475, S480, S490, S431, S432, S433, S434, S435, S436 and S437 will be described below with reference to FIG. 1, FIG. 3, FIG. 4A and FIG. 4B. After step S460 is executed, the renaming circuit 120 further determines the total bit numbers for both the source logical register and the destination logical register of the current instruction (step S470). When both the total bit numbers of the source logical register and the destination logical register are identical to the total bit number of the physical register, the determination result of step S470 is "No". The renaming circuit 120 may assign a second value (such as a logic 0) to a clear bit flag of the physical register and store (update) the clear bit flag in the renaming table module 310 (step S475). Herein, the physical register is corresponding to the destination logical register of the current instruction. After step S475 is executed, the reorder buffer circuit 140 may set the completion flag to mark the current instruction has been executed based on a notification (the check result Fastmov being logic 1) of the renaming circuit 120 (step S490).

When the total bit number of the source logical register or the destination logical register of the current instruction is less than that of the physical register, the determination result of step S470 is "Yes". The renaming circuit 120 may assign a first value (such as logic 1) to the clear bit flag of the physical register and store (update) the clear bit flag in the renaming table module 310 (step S480), and to notify the execution circuit 160 to clear the higher-order bits of the physical register. Herein, the physical register is corresponding to the destination logical register of the current instruction. After step S480 is executed, the reorder buffer circuit 140 may set the completion flag to mark the current instruction has been executed and wait for retirement based on the notification (the check result Fastmov being logic 1) of the renaming circuit 120 (step S490).

Assume the instruction sequence includes the Instruction (4), (5) and (6) described above. When the Instruction (4) is the current instruction, assume the renaming circuit 120 performs a third assignment operation to rename the logical register RAX to the physical register 111, and stores an assignment information of the third assignment operation in the renaming table module 310 as shown by Table 3 below. Table 3 shows the assignment of the third assignment operation, which demonstrates the mapping relationship among destination registers, associated physical registers and clear bit flags. For example, Table 3 shows the mapping relationship that the destination logical register RAX of the Instruction (4) (current instruction) is mapped with the physical register 111 and the clear bit flag 0".

TABLE 3

Yet another example of the renaming table module 310

| Logical register | Physical register | Clear bit flag |
|---|---|---|
| RAX | 111 | 0 |
| ... | ... | ... |

Next, assume the Instruction (5) becomes the current instruction. Since a determination result of step S430 is "Yes" (i.e., the Instruction (5) is a move instruction), the renaming circuit 120 may perform a fourth assignment operation to assign the physical register 111, which has been assigned to the source logical register EAX of the Instruction (5), to the destination logical register ECX of the Instruction (5) (step S460). Accordingly, the logical register ECX is renamed as the physical register 111. Then, the renaming table module 310 updates an assignment information of the fourth assignment operation as shown in Table 4. Table 4 shows the assignment of the fourth assignment operation, which demonstrates the mapping relationship among destination registers, associated physical registers and clear bit flags. For example, Table 4 shows the mapping relationship that the destination logical register ECX of the Instruction (5) (current instruction) is mapped with the physical register 111 and the clear bit flag 0".

TABLE 4

Another example of the renaming table module 310

| Logical register | Physical register | Clear bit flag |
|---|---|---|
| RAX | 111 | 0 |
| ECX | 111 | 1 |
| ... | ... | ... |

Because the physical register 111 is a 64-bit register, and both the logical register EAX and (or) the logical register ECX are 32-bit registers, the Instruction (5) (current instruction) only uses the lower-order bits (bits 31 to 0) of the physical register 111, whereas the higher-order bits (bits 63 to 32) of the physical register 111 are invalid. The renaming circuit 120 further execute step S470 to determine whether the total bit number of the source logical register EAX (which are 32 bits in this example) or that of the destination logical register ECX (which are 32 bits in this example) of the Instruction (5) is less than the total bit number of the physical register 111 (which are 64 bits in this example). Since the determination result of step S470 is "Yes", then the renaming circuit 120 may execute step S480 to assign the first value to the clear bit flag of the physical register 111, herein the physical register 111 is corresponding to the destination logical register EAX of the Instruction (5). And then, the renaming table module 310 updates the clear bit flag (being the first value) of the physical register 111 corresponding to the destination logical register EAX of the Instruction (5) through the multiplexer 320, as shown by the Table 4 above. In response to the first value set to the clear bit flag currently, the renaming circuit 120 may notify the execution circuit 160 to clear the higher-order bits (bits 63 to 32) of the physical register 111.

When the current instruction of the instruction sequence does not include a move instruction, the determination result of step S430 is "No", such that the renaming circuit 120 may execute step S431 to read the renaming table module 310 so as to obtain associated information of the first physical register mapped with the source logical register of the current instruction as well as the clear bit flag of this physical register. The renaming circuit 120 may also provide the information of the current instruction information, the first physical register information and the clear bit flag to the reservation station circuit 150 in step S431. In another embodiment, the mapping relationship of the destination logical register of the current instruction, the first physical register and the clear bit flag may be included in the updated instruction-related information Insinfo and provided to the reservation station circuit 150.

In addition, in step S431, the renaming circuit 120 may also perform a fifth assignment operation to select a not-yet-used physical register from the physical registers 111 to 11*x* of the physical register unit 110 as a second physical register, and assign the selected second physical register to the destination logical register of the current instruction. The renaming circuit 120 may further provide the information of the second physical register to the reservation station circuit 150 in step S431. In another embodiment, the mapping relationship of the destination logical register of the current instruction and the second physical register may be included in the updated instruction-related information Insinfo and provided to the reservation station circuit 150.

For instance, assume the Instruction (6) is the current instruction. Since the Instruction (6) does not include a move instruction, the determination result of step S430 is "No", which may instruct the renaming circuit 120 to read the renaming table module 310 to obtain the clear bit flag of the first physical register (e.g., the physical register 111) and the information of the first physical register 111, wherein the first physical register 111 is corresponding to the source logical register RCX of the Instruction (6). In addition, the renaming circuit 120 may also assign the physical register 112 of the physical registers 111 to 11*x* in the physical register unit 110 to the destination logical register RDX of the Instruction (6). The renaming circuit 120 may also provide information of the Instruction (6), the information of the physical register 111, the information of the physical register 112 and the clear bit flag to the reservation station circuit 150. In another embodiment, these mapping relationships of the destination logical register of the Instruction (6), the physical register 111, the physical register 112 and the clear bit flag may be included in the updated instruction-related information Insinfo and provided to the reservation station circuit 150.

After step S431 is executed, the reservation station circuit 150 may send the current instruction information, the first physical register information, the second physical register information and the clear bit flag, to the execution circuit 160 (step S432). For instance, the reservation station circuit 150 may send the information of the Instruction (6) (the current instruction), the information of the physical register 111 (the first physical register), the information of the physical register 112 (the second physical register) and the clear bit flag, to the execution circuit 160.

After step S432 is executed, the execution circuit 160 may determine whether the clear bit flag of the first physical register, which is corresponding to the source logical register of the current instruction, is the first value (step S433). When the clear bit flag of the first physical register of the current instruction is the first value, a determination result of step S433 is "Yes". The execution circuit 160 may clear these higher-order bits of the first physical register, which is corresponding to the source logical register of the current instruction, and then execute the current instruction (step S434). After step S434 is executed, the execution circuit 160 may write an execution result in the physical register mapped with the destination logical register of the current instruction (step S435). After step S435 is executed, the reorder buffer circuit 140 may set the completion flag to mark the current instruction has been executed and wait for retirement (step S436).

When the clear bit flag of the first physical register, which is corresponding to the source logical register of the current instruction, is the second value (i.e., the determination result of step S433 is "No"), the execution circuit 160 may execute the current instruction (step S437). After step S437 is executed, the execution circuit 160 may store the execution result in the physical register mapped with the destination logical register of the current instruction (step S435). After step S435 is executed, the reorder buffer circuit 140 may set the completion flag to mark the current instruction has been executed (step S436).

For instance, assume the Instruction (6) is the current instruction. When the clear bit flag of the first physical register (e.g., the physical register 111, which is corresponding to the source logical register RCX of the Instruction (6)) is the first value (i.e., the determination result of step S433 is "Yes"), the execution circuit 160 may clear these higher-order bits of the physical register 111 (mapped with the source logical register RCX of the Instruction (6)) and then execute the Instruction (6). When the clear bit flag of the physical register 111 (mapped with the source logical register RCX of the Instruction (6)) is the second value (i.e., the determination result of step S433 is "No"), the execution circuit 160 may directly execute the current instruction (step S437).

In the above example, no other instruction is programmed between the Instructions (4) and (5), or between the Instructions (5) and (6). However, the invention is not limited in this regard. In another embodiment, when a source logical register of an additional instruction is different from the destination logical register of the Instruction (4), and a destination logical register of this additional instruction is different from the source logical register of the Instruction (5), the additional instruction may be programmed between the Instruction (4) and (5). Similarly, when the source logical register of a further additional instruction is different from the destination logical register of the Instruction (5), and the destination logical register of the further additional instruction is different from the source logical register of the Instruction (6), the further additional instruction may be programmed between the Instruction (5) and (6).

In another embodiment, when the current instruction does not include a move instruction, and the current instruction needs to be replayed or reissued after the current instruction is executed, the renaming circuit 120 provides the information of the current instruction, the information of first physical register which was assigned to the source logical register of the current instruction, and the clear bit flag of the first physical register to the reservation station circuit 150 again, so as to re-execute the current instruction.

In summary, the processor and the operating method of the invention may check the instruction sequence. By determining whether the current instruction includes a move instruction, the processor may determine whether to assign the first physical register, which was assigned to the current instruction, to the destination logical register of the current instruction. In this way, the utilization of the physical register may be optimized, and the resource consumption and the computation time of the processor may be reduced. In addition, by determining whether the total bit number of the source logical register of the current instruction or the total bit number of the destination logical register of the current instruction is less than the total bit number of the physical register, the processor may further determine whether to clear these higher-order bits of the physical register to avoid possible data errors.

The invention claimed is:

1. A processor, comprising:
   a plurality of physical registers; and
   a renaming circuit, coupled to the plurality of physical registers, and configured to receive an instruction sequence, wherein the renaming circuit comprises a renaming table module, a multiplexer, a physical register assignment circuit and a fast move checking module, the fast move checking module is configured to determine whether an instruction of the instruction sequence comprises a current move instruction to generate a check result, the physical register assignment circuit is coupled to the fast move checking module for receiving the check result, the physical register assignment circuit performs a first assignment operation according to the check result to generate assignment information, the multiplexer is controlled by the fast move checking module, the multiplexer is coupled between the physical register assignment circuit and the renaming table module, the multiplexer selects to transmit the assignment information output from the physical register assignment circuit or another assignment information stored in the renaming table module according to the check result to the renaming table module,
   in response to that a source logical register of the current move instruction is a destination logical register of a previous instruction of the instruction sequence, the renaming circuit assigns a first physical register, which is assigned to the destination logical register of the previous instruction, to the source logical register of the current move instruction, wherein the first physical register is one of the plurality of physical registers;
   in response to the current move instruction, the renaming circuit performs the first assignment operation to assign the first physical register, which is assigned to the source logical register of the current move instruction previously, to a destination logical register of the current move instruction;
   in response to that a source logical register of a next instruction of the instruction sequence is the destination logical register of the current move instruction, the renaming circuit assigns the first physical register, which is assigned to the destination logical register of the current move instruction, to the source logical register of the next instruction; and
   in response to a next move instruction of the instruction sequence, the renaming circuit performs another assignment operation to assign another physical register, which is assigned to a source logical register of the next move instruction previously, to a destination logical register of the next move instruction, wherein the next move instruction is an instruction following the current move instruction.

2. The processor of claim 1,
   wherein in response to that a current instruction of the instruction sequence does not comprise the current move instruction, the renaming circuit records a first mapping between the source logical register of the current move instruction and the first physical register, in the renaming table module,
   wherein in response to that the current instruction comprises the current move instruction, the renaming circuit records a second mapping between the destination logical register of the current move instruction and the first physical register, in the renaming table module according to the first mapping.

3. The processor of claim 1, further comprising:
   a reorder buffer circuit, coupled to the renaming circuit,
   wherein in response to that a current instruction of the instruction sequence comprises the current move instruction, the reorder buffer circuit sets a completion flag after the first assignment operation is executed.

4. The processor of claim 1, further comprising:
   a reservation station circuit, coupled to the renaming circuit,
   wherein in response to that a current instruction of the instruction sequence comprises the current move instruction, the reservation station circuit ignores the current move instruction.

5. The processor of claim 1, wherein all bits of the first physical register are divided into a plurality of higher-order bits and a plurality of lower-order bits,
   the renaming circuit determines a first total bit number of the source logical register of a current instruction of the instruction sequence, a second total bit number of the destination logical register of the current instruction, and a third total bit number of data bits of the first physical register, and
   in response to that the current instruction comprises the current move instruction and the first total bit number or the second total bit number is less than the third total bit number, the renaming circuit notifies an execution circuit to clear the plurality of higher-order bits.

6. The processor of claim 1, wherein in response to that a current instruction of the instruction sequence does not comprise the current move instruction, the renaming circuit reads the renaming table module to obtain a mapping between the source logical register of the current instruction and a clear bit flag of the first physical register, and provides a third mapping among the current instruction, the first physical register and the clear bit flag to a reservation station circuit of the processor.

7. The processor of claim 6, wherein the renaming circuit performs an assignment operation to assign a second physical register to the destination logical register of the current instruction, wherein the second physical register is one of the plurality of physical registers.

8. The processor of claim 6, wherein when the current instruction does not comprise the current move instruction and requires to replay or resent after the current instruction is executed, the renaming circuit provides the third mapping among the current instruction, information of the first physical register, and the clear bit flag to the reservation station circuit.

9. The processor of claim 6, wherein the reservation station circuit sends the third mapping among the current instruction, the first physical register and the clear bit flag to an execution circuit of the processor.

10. The processor of claim 9, wherein
when the clear bit flag of the first physical register of the current instruction is a first value, the execution circuit clears a plurality of higher-order bits of the first physical register corresponding to the source logical register of the current instruction and then executes the current instruction; and
when the clear bit flag of the first physical register of the current instruction is a second value, the execution circuit executes the current instruction.

11. An operating method of a processor, comprising:
receiving an instruction sequence by a renaming circuit of the processor, wherein the renaming circuit comprises a renaming table module, a multiplexer, a physical register assignment circuit and a fast move checking module; and
determining whether an instruction of the instruction sequence comprises a current move instruction by the fast move checking module to generate a check result, wherein
the physical register assignment circuit is coupled to the fast move checking module for receiving the check result, the physical register assignment circuit performs a first assignment operation according to the check result to generate assignment information, the multiplexer is controlled by the fast move checking module, the multiplexer is coupled between the physical register assignment circuit and the renaming table module, the multiplexer selects to transmit the assignment information output from the physical register assignment circuit or another assignment information stored in the renaming table module according to the check result to the renaming table module;
in response to that a source logical register of the current move instruction is a destination logical register of a previous instruction of the instruction sequence, assigning a first physical register, which is assigned to the destination logical register of the previous instruction, to the source logical register of the current move instruction, wherein the first physical register is one of the plurality of physical registers;
in response to the current move instruction, performing the first assignment operation by the renaming circuit to assign a first physical register, which is assigned to the source logical register of the current move instruction, to a destination logical register of the current move instruction;
in response to that a source logical register of a next instruction of the instruction sequence is the destination logical register of the current move instruction, assigning the first physical register, which is assigned to the destination logical register of the current move instruction, to the source logical register of the next instruction; and
in response to a next move instruction of the instruction sequence, performing another assignment operation by the renaming circuit to assign another physical register, which is assigned to a source logical register of the next move instruction previously, to a destination logical register of the next move instruction, wherein the next move instruction is an instruction following the current move instruction.

12. The operating method of claim 11, further comprising:
in response to that a current instruction of the instruction sequence does not comprise a move instruction, assigning a second physical register to the destination logical register of the current instruction,
wherein the second physical register is one of the plurality of physical registers.

13. The operating method of claim 11, further comprising:
in response to that a current instruction of the instruction sequence does not comprise the current move instruction, recording a first mapping between the current move instruction and the first physical register, in the renaming table module,
in response to that the current instruction comprises the current move instruction, recording a second mapping between the destination logical register of the current move instruction and the first physical register, in the renaming table module according to the first mapping.

14. The operating method of claim 11, further comprising:
in response to that a current instruction of the instruction sequence comprises the current move instruction, setting a completion flag after the first assignment operation is executed.

15. The operating method of claim 11, further comprising:
in response to that a current instruction of the instruction sequence comprises the current move instruction, do not execute the current move instruction.

16. The operating method of claim 11, further comprising:
dividing all bits of the first physical register into a plurality of higher-order bits and a plurality of lower-order bits;
determining a first total bit number of the source logical register of a current instruction of the instruction sequence, a second total bit number of the destination logical register of the current instruction and, and a third total bit number of data bits of the first physical register; and
in response to that the current instruction comprises the current move instruction and the first total bit number or the total bit second number is less than the third total bit number, notifying an execution circuit to clear the plurality of higher-order bits.

17. The operating method of claim 11, further comprising:
in response to that a current instruction of the instruction sequence does not comprise the current move instruction, reading the renaming table module to obtain a mapping between the source logical register of the current instruction and a clear bit flag of the first physical register, and providing a third mapping among the current instruction, the first physical register and the clear bit flag to a reservation station circuit.

18. The operating method of claim 17, further comprising:
performing an assignment operation to assign a second physical register to the destination logical register of the current instruction, wherein the second physical register is one of the plurality of physical registers.

19. The operating method of claim 17, further comprising:
in response to that the current instruction does not comprise the current move instruction, and requires to be replayed or resent after the current instruction is executed, providing the third mapping among the current instruction, the first physical register and the clear bit flag to the reservation station circuit again.

20. The operating method of claim 17, further comprising:
sending the third mapping among the current instruction, the first physical register and the clear bit flag to an execution circuit.

21. The operating method of claim 20, further comprising:
in response to that the clear bit flag of the first physical register of the current instruction is a first value, clearing a plurality of higher-order bits of the first physical register corresponding to the source logical register of the current instruction, and then executing the current instruction by the execution circuit; and
in response to that the clear bit flag of the first physical register of the current instruction is a second value, executing the current instruction through the execution circuit.

\* \* \* \* \*